April 28, 1970   H. D. FOUST   3,508,604

BIMETALLIC DAMPER ACTUATOR

Filed Nov. 4, 1968

INVENTOR.
HARRY D. FOUST
BY
ATTORNEY

United States Patent Office 3,508,604
Patented Apr. 28, 1970

3,508,604
BIMETALLIC DAMPER ACTUATOR
Harry D. Foust, Dakota, Minn., assignor to The Trane Company, La Crosse, Wis., a corporation of Wisconsin
Filed Nov. 4, 1968, Ser. No. 773,219
Int. Cl. F24f 3/00
U.S. Cl. 165—22
8 Claims

ABSTRACT OF THE DISCLOSURE

A bimetallic damper operating mechanism controls and operates two dampers in face and bypass ducts which direct forced air to one of a plurality of zones to be air conditioned. The damper operator has two bimetallic elements which coact to open and close the face and bypass dampers.

BACKGROUND OF THE INVENTION

In multizone air conditioning systems it is desirable at times to cut off flow to one or more of the zones and thereby channel full flow to another zone. When using a face and bypass duct system to each individual zone it is also desirable to proportion the air flow through the coil and bypass ducts thereby attaining proper temperature modulation. In the past this type of modulation has been carried out by automatic damper arrangements which were very cumbersome and expensive.

This invention provides a very simple operating mechanism for actuating face and bypass dampers in a multiple zone system. The mechanism of this invention can effectively modulate air flow between face and bypass and at the same time be used to stop air flow to the particular zone in which the mechanism is operating.

SUMMARY OF THE INVENTION

This invention provides a damper operating mechanism comprising a first shaft adapted to have a first damper connected to one end for rotation about the axis of the shaft, a bracket mounted near the other end of the first shaft, a second shaft adapted to have a second damper connected to one end for rotation about the axis of the shaft, the second shaft connected to the bracket for motion substantially about the axis of the first shaft, stop means on the second shaft coacting with the first shaft to cause the second shaft to rotate upon rotational movement of the first shaft in one direction, means for rotating the first shaft, and means for rotating the second shaft alone in the same direction as the movement translated by the first shaft.

The preferred motive power for this damper operating mechanism is a pair of bimetallic elements operatively mounted on the first and second shafts.

DESCRIPTION OF THE PREFERRED EMBODIMENTS

Figure 1:
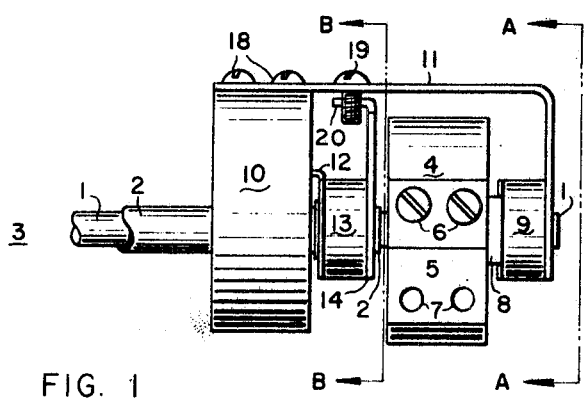
FIGURE 1 is a front elevational view of the bimetallic damper operating mechanism.
Figure 2:
FIGURE 2 is an end view of FIGURE 1 along section A—A.
Figure 3:
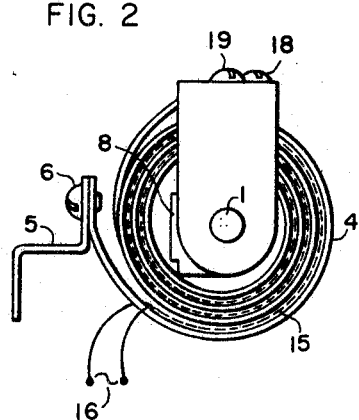
FIGURE 3 is a sectional end view of FIGURE 1 along section B—B.
Figure 3:
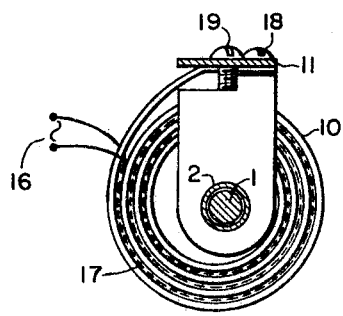

Referring now to the view of the bimetallic damper operating mechanism of FIGURES 1, 2 and 3, a tubular shaft 2 is mounted concentrically about shaft 1. The ends of shafts 1 and 2 extend toward 3. Each are operatively connected to a damper in a face and bypass duct system. Coiled bimetallic element 4 is attached to bracket 5 by screws 6. Bracket 5 is connected to a mounting bracket (not shown) which in turn is connected to the duct system or some other suitable support. Bracket 5 is connected to the mounting bracket by utilizing holes 7. The inner portion of bimetallic elements 4 is rigidly connected to shaft 1 by member 8 and hub member 9. Upon application of heat to the bimetallic element 4, shaft 1 will turn in a clockwise direction (viewing FIGURES 2 and 3). Bracket member 11 is fixedly attached to hub 9. The outer portion of a second bimetallic element 10 is connected to bracket 11 by screws 18. The inner portion of the coiled bimetallic element is connected by member 11 to hub 13. Hub 13 is rigidly attached to hollow shaft 2. Stop means 14 is fixedly attached to hub member 13, extends upwardly and ends in flange 20. Screw 19 is placed in bracket 11 to engage flange 20. As shaft 1 rotates clockwise, so does bracket 11. This motion causes screw 19 to contact flange 20 and concurrently move shaft 2 in a clockwise direction.

When it is desirable to actuate a damper connected to shaft 2 without moving the damper connected to shaft 1, coiled bimetallic element 10 is actuated causing hub member 13 and consequently shaft 2 to rotate in a clockwise direction.

Bimetallic element 4 is heated by an electrical heating element 15 placed between the coils of the bimetallic element 4. The heating element is supplied from power source 16 through leads 21. Likewise bimetallic element 10 is heated by heating element 17 which is powered from source 16 (FIGURE 3) through leads 22.

Figure 4:
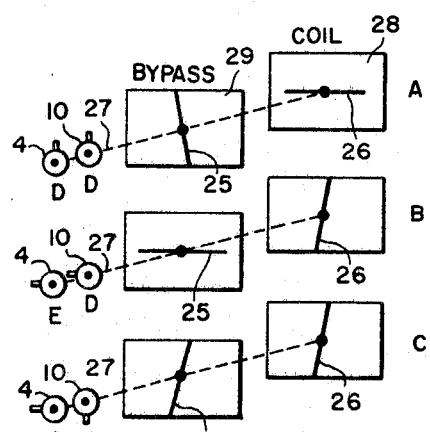
FIGURE 4 is a schematic illustration of the sequential operation of the instant invention.

To more fully understand operation of this novel damper actuating means refer to FIGURE 4. Bimetallic elements 4 and 10 are schematically represented and are connected respectively to coil damper 26 and bypass damper 25 located in coil and bypass ducts 28 and 29. The dotted line 27 represents both the central and surrounding shafts. It is, of course, understood that the damper actuating mechanism of this invention can be made to operate dampers in either a clockwise or counterclockwise rotation. The schematic FIGURE 4 represents a counterclockwise rotational configuration.

At both bimetallic elements 4 and 10 are shown deenergized. In this position, it is preferred that the bypass damper be fully closed and that the coil damper be placed in a fully open position. At B of FIGURE 10 bimetallic element 4 is shown as energized. The rotational movement of the bimetallic element 4 is translated to the bimetallic element 10 via bracket 11 (FIGURE 1), thus causing both the bypass and coil dampers to be rotated through an arc.

At C of FIGURE 4 both bimetallic elements 4 and 10 are shown to be energized. Since the flange 20 (FIGURE 1) allows bimetallic element to rotate shaft 2 independently of shaft 1, the bimetallic element 10 causes the bypass damper to rotate through an angle again slightly less than 90 degrees. Thus both dampers, coil and bypass, are closed.

In the preferred arrangement a bimetallic element and heating element should be chosen such that a temperature equilibrium will be reached at the point where the bimetallic element has caused the shaft to rotate slightly less than 90 degrees. It is preferable, of course, to have the damper bias itself inside the duct to prevent rotation past the desired angle of slightly less than 90 degrees. A preferred coiled bimetallic element is Model No. M833A10071, manufactured by Honeywell, Inc., Minneapolis, Minn.

Figure 5:
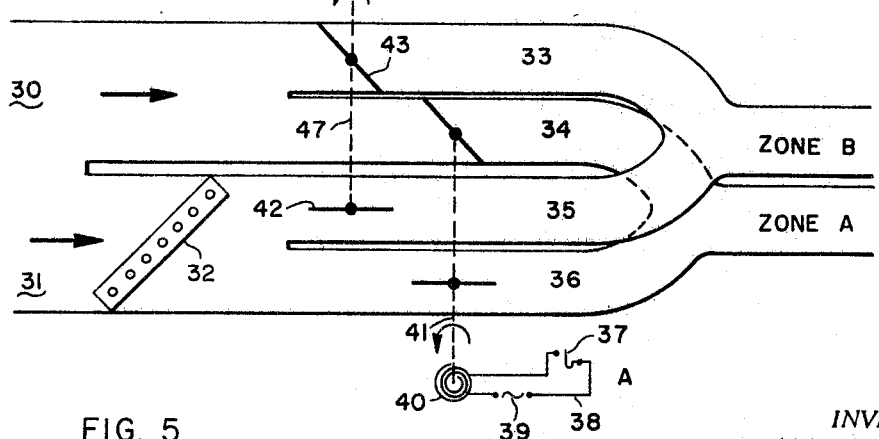
FIGURE 5 is a schematic illustration of an application of the damper operating mechanism of FIGURE 1 to a two zone residential air conditioning system.

A workable system employing the actuator of this invention is schematically shown in FIGURE 5. A fan or some other air moving means (not shown) causes air to flow through the ducts 30 and 31 in the direction of the arrows. Duct 30 is a bypass duct whereas duct 31 contains a coil which has either a heated exchange medium flowing therethrough for heating in the winter or has a refrigerant flowing therethrough for cooling in the summer. Bypass duct 30 is split into two separate ducts 33 and 34 for a two zone system, a system of the type which could be used for residential air conditioning. Bypass duct 33 leads to zone B; bypass duct 34 leads to zone A. Coil duct 31 is also split into two separate ducts, 35 and 36, which lead respectively to zones B and A. The bypass and coil ducts are joined into a single duct to mix the air streams giving uniform air temperature at the point of entrance into the space being conditioned.

A single bimetallic damper element is shown operating dampers in the coil and bypass ducts 36 and 34 leading to zone A. A thermostat 37 closes the circuit 38 thus applying power from source 39 to the heating element in the bimetallic element 40. As the bimetal temperature rises, shaft 41 will rotate. The bimetallic elements should be chosen to allow approximately 10 to 20 minutes for travel through its full arc. Since a thermostat has a significantly higher response time than does the bimetallic element, the bimetallic element can be used to modulate or proportion bypass and coil air going to zone A.

Likewise bimetallic element 4 which is connected to coil damper 42 and coacting with bimetallic element 10 which is connected to bypass damper 43 can be used to modulate air flow to zone B. Thermostatic element 44 closes circuit 45 and applies the power from source 46 to the heating element of bimetallic element 4. Shaft 47 will then rotate modulating the airflow to zone B. If it were desirable then to eliminate all of the airflow to zone B and direct it all to zone A, for example, when zone A has a high heat load relative to zone B, switch 48 is closed. Circuit 49 then directs the power from source 46 to the heating elements of both bimetallic elements 4 and 10 causing both dampers 42 and 43 to close in a manner similar to that of FIGURE 4, part C. Of course, when the heat load in zone A is reduced, switch 48 can be opened, placing bimetallic element 4 back into thermostatic circuit 45. Bimetallic element 10 would then cool, leaving dampers 42 and 43 dependent upon bimetallic element 4.

It can easily be seen that operation of switch 48 need not be manual. It can be placed on a thermostatic circuit which would measure the relative difference in temperatures between zone A and zone B. When the temperature difference reached a predetermined point, the switch 48 would be set to automatically close, thus placing zone A under full capacity of the ventilating system.

What is claimed is:
1. A damper operating mechanism comprising:
 (a) a first shaft adapted on one end to drive a first damper about the axis of said first shaft,
 (b) a bracket mounted near the other end of said first shaft,
 (c) a second shaft adapted on one end to drive a second damper about the axis of said second shaft, said second shaft mounted for motion substantially about the axis of said first shaft,
 (d) a first bimetallic element operatively connected to said first shaft to rotate said first shaft through an arc when said first element is activated,
 (e) a second bimetallic element connected to said bracket and to said second shaft to rotate said second shaft through an arc when said second element is activated, the motion of said first shaft translated to said second shaft through said bracket and said second bimetallic element.

2. The damper of claim 1 further comprising stop means on said second shaft coacting with said first shaft to cause said second shaft to rotate upon rotational motion of said first shaft in one direction and to prevent oscillation of said second shaft within said second bimetallic element.

3. The damper of claim 1 wherein said first shaft is a rod and said second shaft is a tube mounted concentrically about said rod.

4. The damper of claim 1 including thermal activating means for said bimetallic elements.

5. The damper operating mechanism of claim 4 in an air conditioning system comprising a coil and bypass duct to each of a plurality of zones, a damper mounted in each of said coil and bypass ducts leading to at least one of said zones, said first shaft operably connected to one of said dampers, said second shaft operatively connected to the other of said dampers, first circuit means including a thermostatic switch means connected to said thermal activating means of said first bimetallic element, second circuit means including a switch means in series with said thermal activating means of said second bimetallic element, a power source for said circuit means.

6. The mechanism of claim 7 wherein said second circuit means is connected in series with said thermal activating means of said first and second bimetallic elements.

7. A damper operating mechanism comprising:
 (a) a first shaft adapted to have a first damper connected to one end for rotation about the axis of said shaft,
 (b) a bracket mounted near the other end of said first shaft,
 (c) a second shaft adapted to have a second damper connected to one end for rotation about the axis of said second shaft, said second shaft connected to said bracket for motion substantially about the axis of said first shaft,
 (d) stop means on said second shaft coacting with said first shaft to cause said second shaft to rotate upon rotational movement of said first shaft in one direction,
 (e) means for rotating said first shaft,
 (f) means for rotating said second shaft alone in the same direction as the movement translated by said first shaft.

8. The damper operating mechanism of claim 7 wherein said rotating means are bimetallic elements.

References Cited
UNITED STATES PATENTS 2,238,689    4/1941    Locke _____ 165—22

ROBERT A. O'LEARY, Primary Examiner

C. SUKALO, Assistant Examiner

U.S. Cl. X.R.
165—103, 36